(12) United States Patent
Obeng et al.

(10) Patent No.: US 6,846,225 B2
(45) Date of Patent: Jan. 25, 2005

(54) SELECTIVE CHEMICAL-MECHANICAL POLISHING PROPERTIES OF A CROSS-LINKED POLYMER AND SPECIFIC APPLICATIONS THEREFOR

(75) Inventors: Yaw S. Obeng, Orlando, FL (US); Edward M. Yokley, Penbroke Pines, FL (US)

(73) Assignee: PsiloQuest, Inc., Orlando, FL (US)

( * ) Notice: Subject to any disclaimer, the term of this patent is extended or adjusted under 35 U.S.C. 154(b) by 102 days.

(21) Appl. No.: 10/000,101

(22) Filed: Oct. 24, 2001

(65) Prior Publication Data

US 2002/0102924 A1 Aug. 1, 2002

Related U.S. Application Data

(60) Provisional application No. 60/250,299, filed on Nov. 29, 2000, provisional application No. 60/295,315, filed on Jun. 1, 2001, and provisional application No. 60/304,375, filed on Jul. 10, 2001.

(51) Int. Cl.[7] ................................................. B24B 1/00
(52) U.S. Cl. ........................ 451/41; 451/60; 451/285; 451/290; 521/92; 521/134; 204/159.17; 204/159.24
(58) Field of Search ................... 451/41, 60, 285–290, 451/527, 530, 534, 921; 521/92, 93, 134, 140, 149, 907, 908; 438/692, 693, 645; 252/79.4; 156/636.1, 345; 51/298; 523/206, 216

(56) References Cited

U.S. PATENT DOCUMENTS

| | | | |
|---|---|---|---|
| 4,331,453 A | * 5/1982 | Dau et al. ..................... 51/298 |
| 4,446,254 A | 5/1984 | Nakae et al. |
| 4,613,345 A | 9/1986 | Thicke et al. |
| 4,946,903 A | 8/1990 | Gardella, Jr. et al. |
| 5,516,400 A | 5/1996 | Pasch et al. |
| 5,624,303 A | 4/1997 | Robinson |
| 5,858,140 A | * 1/1999 | Berger et al. .............. 156/62.2 |
| 5,945,486 A | 8/1999 | Vargo et al. |
| 6,051,500 A | 4/2000 | Maury et al. ................ 438/692 |
| 6,062,968 A | * 5/2000 | Sevilla et al. ............... 451/526 |
| 6,063,306 A | 5/2000 | Kaufman et al. |
| 6,083,838 A | 7/2000 | Burton et al. |
| 6,099,954 A | 8/2000 | Urbanavage et al. |
| 6,117,000 A | * 9/2000 | Anjur et al. ................. 451/526 |
| 6,126,532 A | * 10/2000 | Sevilla et al. ............... 451/526 |
| 6,132,298 A | 10/2000 | Zunigna et al. |
| 6,150,271 A | 11/2000 | Easter et al. |
| 6,231,942 B1 | 5/2001 | Blizard et al. |
| 6,267,644 B1 | 7/2001 | Molnar |
| 6,283,829 B1 | 9/2001 | Molnar |
| 6,290,589 B1 | 9/2001 | Tolles |
| 6,291,349 B1 | 9/2001 | Molnar |
| 6,293,851 B1 | 9/2001 | Molnar |
| 6,346,202 B1 | 2/2002 | Molnar |
| 6,354,915 B1 | 3/2002 | James et al. |
| 6,390,890 B1 | * 5/2002 | Molnar ......................... 451/41 |
| 6,413,153 B1 | 7/2002 | Molnar |
| 6,428,388 B2 | 8/2002 | Molnar |
| 6,435,948 B1 | 8/2002 | Molnar |
| 6,544,104 B1 | * 4/2003 | Koike et al. .................... 451/9 |
| 6,585,574 B1 | 7/2003 | Lombardo et al. ............ 451/285 |
| 6,648,733 B2 | * 11/2003 | Roberts et al. ................ 451/41 |

FOREIGN PATENT DOCUMENTS

| | | |
|---|---|---|
| DE | 01 064776 | 3/1989 |
| EP | 0 884 349 A1 | 12/1998 |
| JP | 08 078369 | 3/1996 |
| JP | 9132661 | 5/1997 |
| JP | 11 245164 | 9/1999 |
| WO | WO 9962673 | 12/1999 |

\* cited by examiner

*Primary Examiner*—Joseph J. Hail, III
*Assistant Examiner*—Anthony Ojini

(57) ABSTRACT

The present invention is directed, in general, to a method of polishing a surface on substrates, such as semiconductor wafers and, more specifically, to a polishing pad suitable for this purpose. The polishing pad comprises a polishing body that includes a cross-linked polymer material, and may be incorporated into a polishing apparatus. Polishing includes positioning the substrate containing at least one layer against the polishing body and polishing the layer.

7 Claims, 3 Drawing Sheets

Contour Plot: IC1400 Pad

Contour Plot: A32 Pad

SELECTIVE CHEMICAL-MECHANICAL POLISHING PROPERTIES OF A CROSS-LINKED POLYMER AND SPECIFIC APPLICATIONS THEREFOR

CROSS-REFERENCE TO PROVISIONAL APPLICATION

This application claims the benefit of U.S. Provisional Application 60/250,299 entitled "SUBSTRATE POLISHING DEVICE AND METHOD," to Edward M. Yokley, filed on Nov. 29, 2000; U.S. Provisional Application 60/295,315 entitled, "A METHOD OF ALTERING PROPERTIES OF A POLISHING PAD AND SPECIFIC APPLICATIONS THEREFOR," to Yaw S. Obeng and Edward M. Yokley, filed on Jun. 1, 2001; and U.S. Provisional Application 60/304,375 entitled, "A METHOD OF ALTERING PROPERTIES OF A THERMOPLASTIC FOAM POLISHING PAD AND SPECIFIC APPLICATIONS THEREFOR," to Yaw S. Obeng and Edward M. Yokley, filed on Jul. 10, 2001, which are commonly assigned with the present invention and incorporated herein by reference as if reproduced herein in its entirety.

TECHNICAL FIELD OF THE INVENTION

The present invention is directed to polishing pads used for creating a smooth, ultra-flat surface on such items as glass, semiconductors, dielectric/metal composites, magnetic mass storage media and integrated circuits. More specifically, the present invention relates to the selective mechanical and chemical polishing properties of a cross-linked polymer and its application to create pads suitable for polishing a substrate.

BACKGROUND OF THE INVENTION

Chemical-mechanical polishing (CMP) is used increasingly as a planarizing technique in the manufacture of very large scale integration (VLSI) integrated circuits. It has potential for planarizing a variety of materials in IC processing but is used most widely for planarizing metallizied layers and interlevel dielectrics on semiconductor wafers, and for planarizing substrates for shallow trench isolation. The efficient polishing of copper surfaces has taken on added importance due to the wide spread use of the copper damascene process.

There are three critical consumable components in the CMP process. The first is the abrasive liquid slurry. The abrasive liquid slurry's composition must be altered, and special formulations must be produced for each different substrate being polished. For example, some substrates require a high pH to be activated for polishing, while other substrates need a more acid environment. Still other substrates respond best to silica abrasives, while others require alumina or titanium abrasive particles. The second critical consumable component in the CMP process is the polishing pad. It must be very flat, uniform across its entire surface, and resistant to the chemical nature of the slurry and have the right combination of stiffness and compressibility to minimize effects like dishing and erosion. A third critical consumable component in the CMP process is the carrier film. The carrier film attaches the wafer to its rotating holder must be: adequately flat and uniform in its thickness; an adhesive that will hold it tightly to the carrier but not too tightly to the wafer; and immune to the chemical environment in which it works.

In trench isolation, large areas of field oxide must be polished to produce a planar starting wafer. Integrated circuits that operate with low voltages, i.e., 5 volts or less, and with shallow junctions, can be isolated effectively with relatively shallow trenches, i.e., less than a micron. In shallow trench isolation (STI) technology, the trench is backfilled with oxide and the wafer is planarized using CMP. The result is a more planar structure than typically obtained using LOCOS, and the deeper trench (as compared with LOCOS) provides superior latch up immunity. Also, by comparison with LOCOS, STI substrates have a much reduced "bird's beak" effect and thus theoretically provide higher packing density for circuit elements on the chips. The drawbacks in STI technology to date relate mostly to the planarizing process. Achieving acceptable planarization across the full diameter of a wafer using traditional etching processes has been largely unsuccessful. By using CMP, where the wafer is polished using a mechanical polishing wheel and a slurry of chemical etchant, unwanted oxide material is removed with a high degree of planarity.

It is also well known that integrated circuit fabrication on semiconductor wafers require the formation of precisely controlled apertures, such as contact openings or "vias," that are subsequently filled and interconnected to create components and VLSI or ultra large scale integration (ULSI) circuits. Equally well known is that the patterns defining such openings are typically created by optical lithographic processes that require precise alignment with prior levels to accurately contact the active devices located in those prior levels. In multilevel metallization processes, each level in the multilevel structure contributes to irregular topography. In three or four level metal processes, the topography can be especially severe and complex. The expedient of planarizing the interlevel dielectric layers, as the process proceeds, is now favored in many state-of-the-art IC processes. Planarity in the metal layers is a common objective, and is promoted by using plug interlevel connections. A preferred approach to plug formation is to blanket deposit a thick metal layer on the interlevel dielectric and into the interlevel windows, and then remove the excess using CMP. In a typical case, CMP is used for polishing an oxide, such as $SiO_2$, $Ta_2O_5$, $W_2O_5$. It can also be used to polish nitrides such as $Si_3N_4$, TaN, TiN, and conductor materials used for interlevel plugs, e.g., Cu, W, Ti, and TiN.

During conventional metal chemical-mechanical polishing (CMP) of metal stacks, an oxidant is used to convert the top metal to metal oxides. These metal oxides are subsequently abraded in situ with some harder metal oxide abrasives. It certain applications, it is desirable to selectively polish such metal surfaces without removing the underlying nitride surface, for example. In such situations, selective metal polishing and precise end-point detection are desirable features.

During metal CMP, areas dense in features (i.e., alignment marks) tend to oxidize at a faster rate than areas with sparse distributions. This uncontrollable oxidation of the metals forming the alignment marks is commonly referred to as oxide erosion. Additionally, manufacturers have observed that oxide erosion in dense arrays increases dramatically as batch sizes are increased.

Traditionally, polishing pads are composed of stacked polyurethane based materials, containing a softer bottom structure and harder top surface used for polishing. Two examples of such pads in wide commercial use include the IC1400™ and IC1000/SUBAIV™, pads, manufactured by Rodel®, Inc. (Phoenix, Ariz.). Such polyurethane pads, however, are subject to wear down and glazing due to hydrolysis during polishing, with consequent deleterious effects on the rate and uniformity of planarization. This in turn requires frequent reconditioning to restore the pad's surface properties, with a subsequent loss in productivity and increase in costs.

Accordingly, what is needed in the art is an improved design for a semiconductor wafer polishing pad that reduces scratches and resultant yield loss during chemical/mechanical planarization, provides selective metal polishing and end-point detection of such polishing.

SUMMARY OF THE INVENTION

To address the deficiencies of the prior art, the present invention, in one embodiment, provides a polishing pad comprising a polishing body comprising a material wherein said material is a cross-linked polymer.

In another embodiment, the present invention provides a polishing apparatus. This particular embodiment includes a mechanically driven carrier head, a polishing platen, and a polishing pad attached to the polishing platen. The carrier head is positionable against the polishing platen to impart a polishing force against the polishing platen. The polishing pad includes a polishing body comprising a material wherein the material is a cross-linked polymer.

Yet another embodiment provides a method of polishing a substrate. The method comprises positioning a substrate having at least one layer of material located thereon against a polishing pad attached to a polishing apparatus wherein the polishing pad includes a polishing body comprising a cross-linked polymer; and polishing the layer of material against the polishing pad.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the invention, reference is now made to the following descriptions taken in conjunction with the accompanying drawing, in which.

DETAILED DESCRIPTION

We have discovered that polishing pads containing a polishing body comprised of a crossed-linked polymer have unexpected desirable polishing properties. In particular, pads formed from such material are capable of uniformly and rapidly removing a metal surface, such as copper, with relatively much slower removal rates of an underlying tantalum barrier layer and the silicon wafer.

In one particular embodiment, the cross-linked polymer may be made from a thermoplastic foam polymer. Alternatively, the polishing pad may be made from a thermoplastic foam elastomer. In other embodiments, the cross-linked polymer has a closed cell structure. In another embodiment, the thermoplastic foam may include cross-linked polyolefins, such as polyethylene, polypropylene, and combinations thereof. In particularly useful embodiments, the crosslinked polymer may be a crosslinked polyethylene closed-cell foam such as Volara™, available from Merryweather Foam, Inc. (Anthony, N.Mex.); or Aliplast™, available JMS Plastics Supply, Inc. (Neptune, N.J.), or from Atlas International (Sacramento, Calif.).

Figure 1:
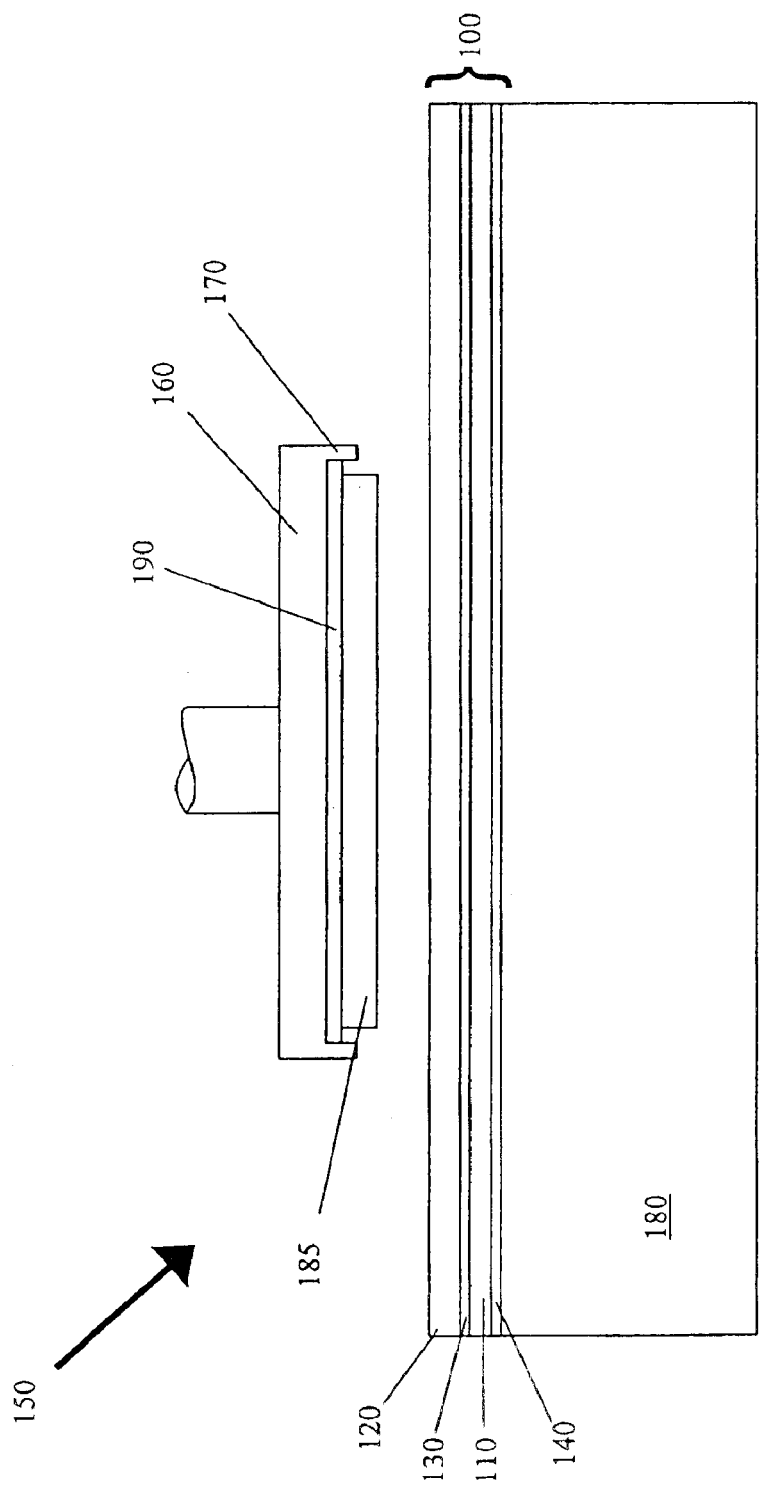
FIG. 1 illustrates a polishing apparatus, including a polishing pad fabricated using a cross-linked polymer made according to the present invention.

The cross-linked polymer of this invention may be fabricated by melt extrusion of the pellets into sheets, and then pads made by laser cutting, die cutting or similar process familiar to those skilled in the art of thermoplastic processing. Referring to FIG. 1, these cross-linked polymers may then be incorporated into a polishing body 100 that includes a base pad 110, where a cross-linked polymer pad 120 forms a polishing surface located over the base pad 110. Optionally, a first adhesive material 130, such as epoxy or other materials well known to those skilled in the art, may be used to couple the base pad 110 to the cross-linked polymer pad 120. The polishing pads thus formed may also have a second adhesive material 140, well known to those skilled in the art, applied to the platen side. The polishing pad may then be cleaned and packaged for use.

With continuing reference to FIG. 1, the polishing body 100 may then be employed in a variety of CMP processes by incorporation into a polishing apparatus 150. The polishing apparatus 150 typically includes a mechanically driven carrier head 160, carrier ring 170, polishing platen 180, and a polishing pad that includes the polishing body 100 comprising the cross-linked polymer pad 120 of the present invention, attached to the polishing platen 180, optionally using the second adhesive 140. The substrate to be polished 185, typically a wafer, may be attached to the carrier ring with the aid of a third adhesive 190 also well known to those skilled in the art. The carrier head 160 is then positioned against the polishing platen 180 to impart a polishing force against the polishing platen 180, typically a repetitive, regular motion of the mechanically driven carrier head 160, while providing an appropriate slurry mixture well known to those skilled in the art.

With continuing reference to FIG. 1, in such polishing processes, substrates 185 may be polished by positioning the substrate 185, having at least one layer, on to the above-described polishing apparatus 150, and polishing the layer against the cross-linked polymer pad 120 of the present invention. In one embodiment, the substrate 185 has at least one layer of material that is a metal layer. In a particular embodiment, the metal layer is copper. In another embodiment, the substrate 185 is located on a semiconductor wafer. Cross-linked polymer pads 120 of the present invention are particularly suited for polishing in shallow trench isolation (STI) in integrated circuit fabrication or other fabrication techniques where large areas of field oxide or other dielectrics must be removed from the wafer to produce a planar surface prior to subsequent processing. The cross-linked polymer pad 120 of the present invention are also desirable for polishing interlevel plug materials such as W, Ti, Cu, Al, and other metals as well as nitrides or barrier materials such as $Si_3N_4$, TaN, TiN.

Another embodiment of the present invention includes a method to determine an endpoint for metal polishing. The endpoint may be determined by detecting a change in the coefficient of friction or a change in an acoustic signal during substrate polishing using the cross-linked polymer pad 120 of the present invention associated with the transition from removing the metal layer to removing at least a portion of another layer. Detection apparatus for determining changes in coefficient of friction or a change in an acoustic signal, such as that described by CETR, Inc. (Campbell, Calif.), may be used.

Experiments

The copper polishing properties of polishing pads made according to the present invention were compared to conventional polishing pads. First, a polishing apparatus was prepared according to the present invention by including a polishing pad whose polishing body comprised a cross-linked polymer, attaching the pad to a polishing platen, and attaching the platen to a mechanically driven carrier head. Specifically, the cross-linked polymer used was Type 6A or Type 10 Aliplast®(JMS Plastic Supplies, Neptune, N.J.). Both are cross-linked closed cell polyethylene foam having a medium density and hardness of about 34 Shore A (Type 6A) and about 60 Shore A (Type 10). The blanket Copper polishing properties of polishing pads incorporating these materials, designated A32 and A40, respectively, were compared to two commercially available pads: an IC1400 pad, and an IC1000/SUBA IV pad stack (both manufactured by Rodel, Phoenix, Ariz.) in two experimental protocols.

In the first protocol, an experiment to compare the uniformity of copper polishing using the IC1400 pad versus the A32 pad was carried out for 1 or 2 minutes using an IPEC-372 polisher (formerly IPEC, Inc., now SpeedFam-IPEC, Inc., Chandler, Ariz.) with a down force of 3.5 psi; table and carrier speeds of 90 and 85 rpm, respectively; and slurry flow of 200 ml/min. The slurry was obtained from DuPont Air Products Nanomaterials, LLC (Carlsbad, Calif.), contained hydrogen peroxide, and was adjusted to a pH of about 4. Ex situ pad conditioning was used. Tetraethylorthosilicate (TEOS) wafers having a deposited copper surface and an underlying 250 Å thick tantalum barrier layer were used.

Figures 2A, 2B:
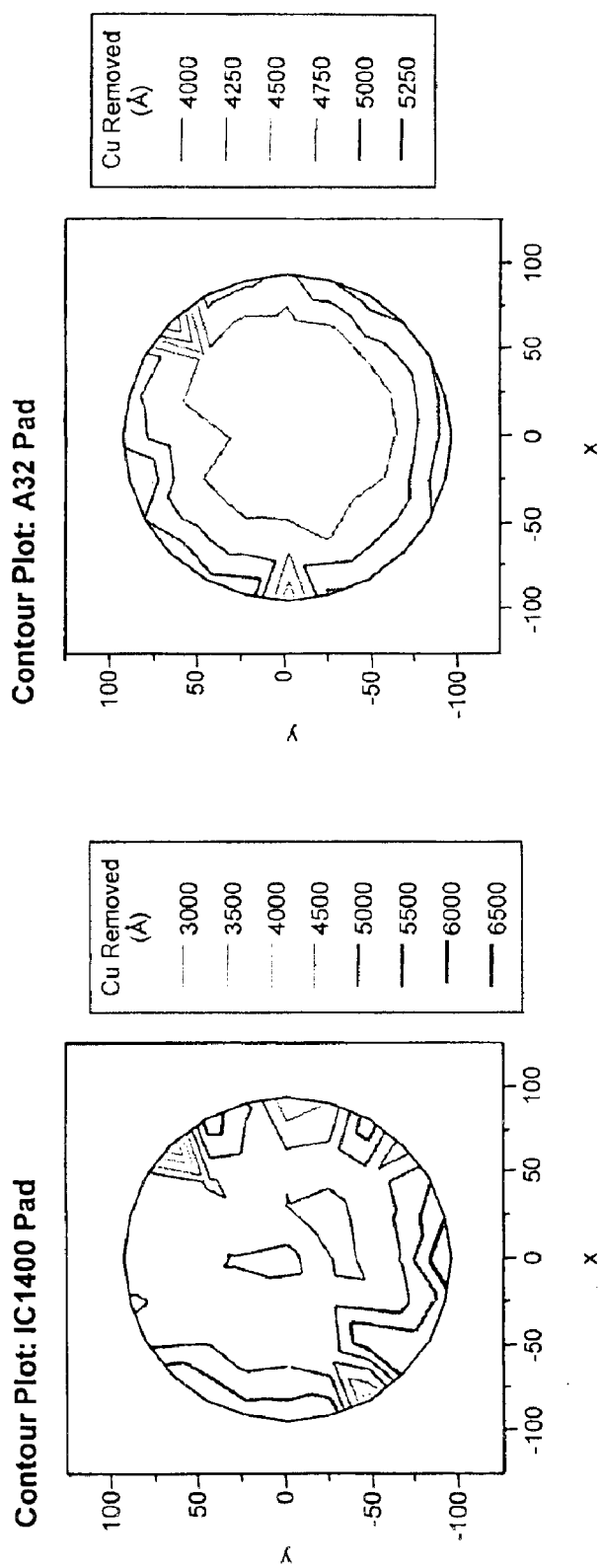
FIG. 2 illustrates an exemplary contour plot of the depth of Copper removed during the polishing of a TEOS wafer having a layer of Copper and an underlying Ta barrier layer, using a pad (A32) fabricated using a cross-linked polymer according to the present invention, and a conventional polyurethane pad (IC1400)

Contour plots of copper surfaces polished using the IC 1400 versus the A32 pad were measured electrically by measuring sheet resistance at 49 points distributed radially across the wafer. Texture maps were generated using software obtained from ResMatÒ Corporation (Resmat map model 487; Montreal, Quebec, Canada). As illustrated in FIG. 2A, the depth of copper removed across the wafer using the IC 1400 pad ranged from 3000 to 6500 Å, and from 2000 to 5500 Å in a second experiment (not shown). In contrast, as illustrated in FIG. 2B. the depth of copper removed using the A32 pad was more uniform, ranging from only 4000 to 5250 Å.

Using the same experimental protocol, in a second experiment, the average and standard deviation for the removal rate of copper (i.e., the average of 49 measurement points) was compared for the IC1400 pad versus the A32 pad. The copper removal rate and its standard deviation using the A32 pad (4931±715 Å/min) was not significantly different than the removal rate obtained using the IC1400 pad (5446±760 and 5429±801 Å/min, in two experiments). Thus, the A32 pad removed copper at a rate comparable to that of a commercial pad.

Polishing using the A32 pad was continued until the copper layer was entirely removed and the Ta layer was polished for an additional two minutes. The thickness of Ta removed narrowly ranged from 75 to 175 Å, and the average rate of removal over all 49 measurement points was only about 41 Å/min. Finally, polishing was continued until the entire Ta layer was removed, and the underlying TEOS wafer was polished. The removal rate of the TEOS was about 45 Å/min. Thus, the A32 pad polished the underlying Ta layer and TEOS wafer at much slower rates than the Copper layer. This shows that the A32 pad has a higher selectivity for Copper removal, as compared to Ta or Si.

Also using the same protocol, a third experiment was performed to examine the effect of two parameters, down force and table speed, on the removal rate of copper using the A32 pad. Three different down forces (i.e., 3, 4.4 and 5 psi) and table speeds (i.e., 40, 60 and 90 rpm) were examined. Either down force or table speed were held constant while the other of these two parameters was successively adjusted to each of the three above-mentioned values. The removal rate increased as a linear function of increasing down force. For example, at a table speed of 40 rpm, the removal rate increased from 3416±875 Å/min, with a down force of 3 psi, to 6826±491 Å/min, with a down force of 5 psi. In contrast, the removal rate was relatively invariant at different table speeds. For example, at a down force of 3 psi, the removal rate increased slightly from 3416±875 Å/min with a table speed of 40 rm, to 4452±730 Å/min with a table speed of 80. Thus, of these two parameters, it is more desirable to adjust down force to produce faster removal rates.

In the second experimental protocol, the blanket copper polishing properties of the A32 pad was compared to the IC1000/SUBA IV pad stack. The comparison was performed using a Model PMT-A CMP tester (CETR, Inc., Campbell, Calif.), operated with a down force of 3 psi and table speed of 200 rpm. The PMT-A CMP tester was equipped with both a coefficient of friction and an acoustic signal detector. An EP-C5001 slurry, (Cabot Microelectronics, Inc., Aurora, Ill.) containing hydrogen peroxide and adjusted to a pH of about 6.1, was used. TEOS wafers having a 16,000 Å thick copper surface and underlying 300 Å thick tantalum barrier layer were used.

Figure 3:
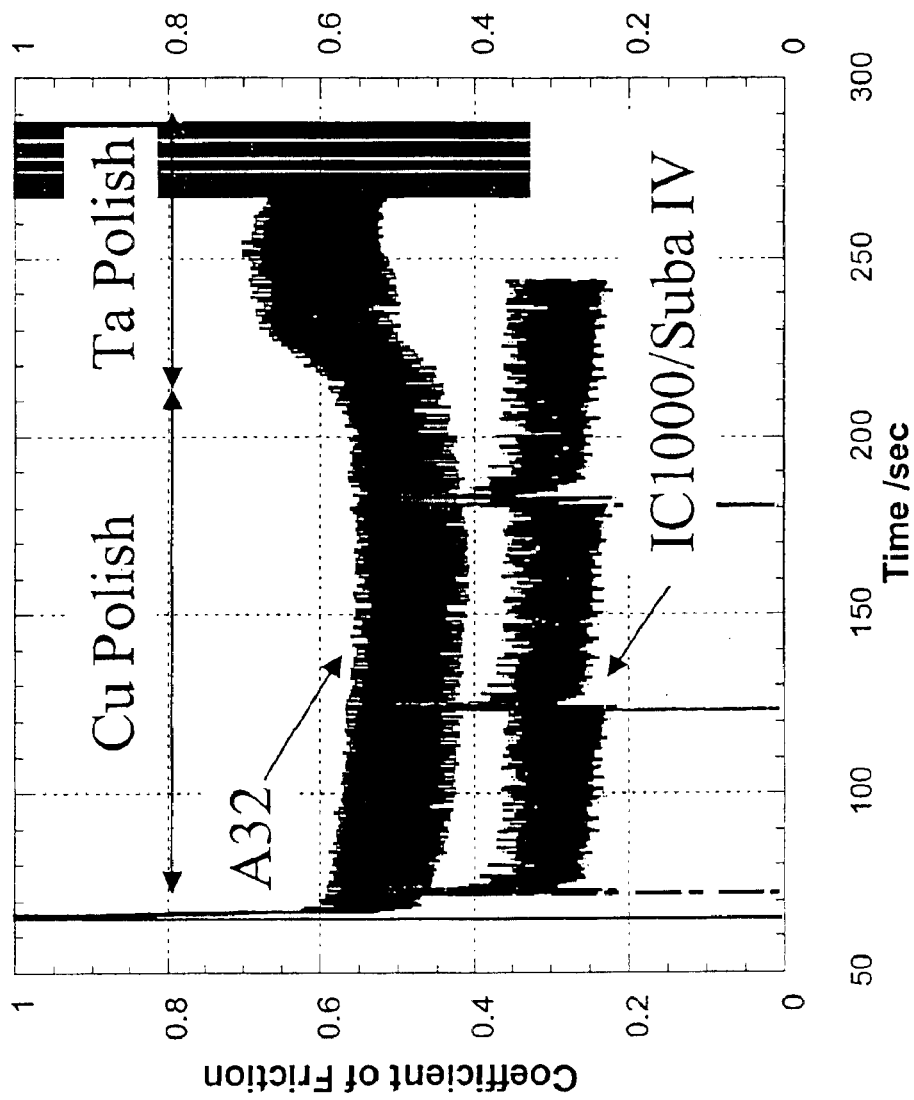
FIG. 3 illustrates an exemplary change in coefficient of friction determined during the polishing of a TEOS wafer having a layer of Copper and an underlying Ta barrier layer, using a pad (A32) fabricated using a cross-linked polymer accord to the present invention, and a conventional polyurethane pad (IC1000/SUBA IV).

As illustrated in FIG. 3, during the copper polishing stage, the coefficient of friction measured by the tester for the A32 pad was more uniform compared to the IC1000/SUBA IV pad stack. Moreover, during a 300 second polishing period, the IC1000/SUBA IV pad never completely removed the Copper layer, whereas the A32 pad removed the Cu layer in about 220 s, as determined by an increase the coefficient of friction when the Ta layer was reached or as similarly determined by an decrease in the acoustic signal (not shown).

Using the same protocol, removal rates and the selectivity of removal of Cu versus Ta were compared for the A32 and A40 pads versus the IC1000/SUBA IV pad stack. The rates of Cu and Ta removal were about 5700 Å/min and about 170 Å/min, respectively, using the IC1000/SUBA IV pad. In comparison, rates of Cu and Ta removal were about 5000 Å/min and about 185 Å/min, respectively, using the A40 pad. Thus, the selectivity of Cu over Ta removal, as characterized by the ratio of rates of Cu to Ta removal were about 33.5 and 27, for the IC1000/SUBA IV and A40 pads, respectively. For the A32 pad the Cu removal rate was about 3,300 5000 Å/min. Both A32 and A40 pads were able to effectively polish wafers having a tungsten surface.

Although the present invention has been described in detail, those skilled in the art should understand that they can make various changes, substitutions and alterations herein without departing from the spirit and scope of the invention in its broadest form.

What is claimed is:

1. A polishing pad comprising:
   a polishing body comprising a cross-linked polymer having a hardness ranging from about 34 Shore A to about 60 Shore A and said cross-linked polymer has a selectivity of Cu to Ta removal rates of greater than about 27:1.

2. The polishing pad as recited in claim 1 wherein said cross-linked polymer is a thermoplastic foam.

3. The polishing pad as recited in claim 1 wherein said cross-linked polymer has a closed cell structure.

4. The polishing pad as recited in claim 3 wherein said cross-linked polymer is polyethylene.

5. The polishing pad as recited in claim 1 wherein said polishing body includes a base pad and said cross-linked polymer forms a polishing surface located over said base pad.

6. The polishing pad as recited in claim 1 wherein said cross-linked polymer is a polyethylene having a closed cell structure.

7. The polishing pad as recited in claim 1 wherein said hardness is about 34 Shore A.

* * * * *